United States Patent [19]

Blake

[11] Patent Number: 4,751,866

[45] Date of Patent: Jun. 21, 1988

[54] RATIO VALVE TO CONTROL UNLOADING OF MODULATING RELIEF VALVE

[75] Inventor: William W. Blake, Kewanee, Ill.

[73] Assignee: Caterpillar Inc., Peoria, Ill.

[21] Appl. No.: 914,974

[22] Filed: Oct. 3, 1986

[51] Int. Cl.[4] .......................... F01B 3/00; F16D 19/00
[52] U.S. Cl. ...................................... 91/446; 91/448; 192/85 R
[58] Field of Search .............. 91/446, 448; 192/109 F, 192/85 R

[56] References Cited

U.S. PATENT DOCUMENTS

| | | | |
|---|---|---|---|
| 3,566,716 | 3/1971 | Chatterjea | 74/856 |
| 3,799,308 | 3/1974 | Erisman | 192/87.13 |
| 4,046,160 | 9/1977 | Horsch | 137/115 |
| 4,132,302 | 1/1979 | Chatterjea | 192/87.13 |
| 4,676,348 | 6/1987 | Coutant | 192/85 R X |
| 4,676,349 | 6/1987 | Coutant | 192/3.57 |

*Primary Examiner*—William E. Wayner
*Attorney, Agent, or Firm*—J. W. Burrows

[57] ABSTRACT

Fluid systems for controlling clutch engagement normally have modulating pressure relief valves to aid in smooth clutch engagement. It is also desired in such systems to ensure that the system pressure is reduced to a low level so that the load piston is fully reset prior to initial engagement of the newly filled clutch. In this arrangement, in order to ensure that the load piston is fully reset, a mechanism is provided which establishes a ratio between the pressure of the fluid being directed to the clutch and the pressure of the fluid acting on the load piston of the modulating pressure relief valve so that the pressurized fluid acting on the load piston during the filling of the clutch is vented to the reservoir to reset the load piston even though the pressure of the fluid available to the clutch is still at a higher pressure level. The ratio valve mechanism is located within the valve spool of the modulating pressure relief valve thus providing a simple and compact valve mechanism which reduces the total system size and further eliminates additional conduits and/or lines.

16 Claims, 3 Drawing Sheets

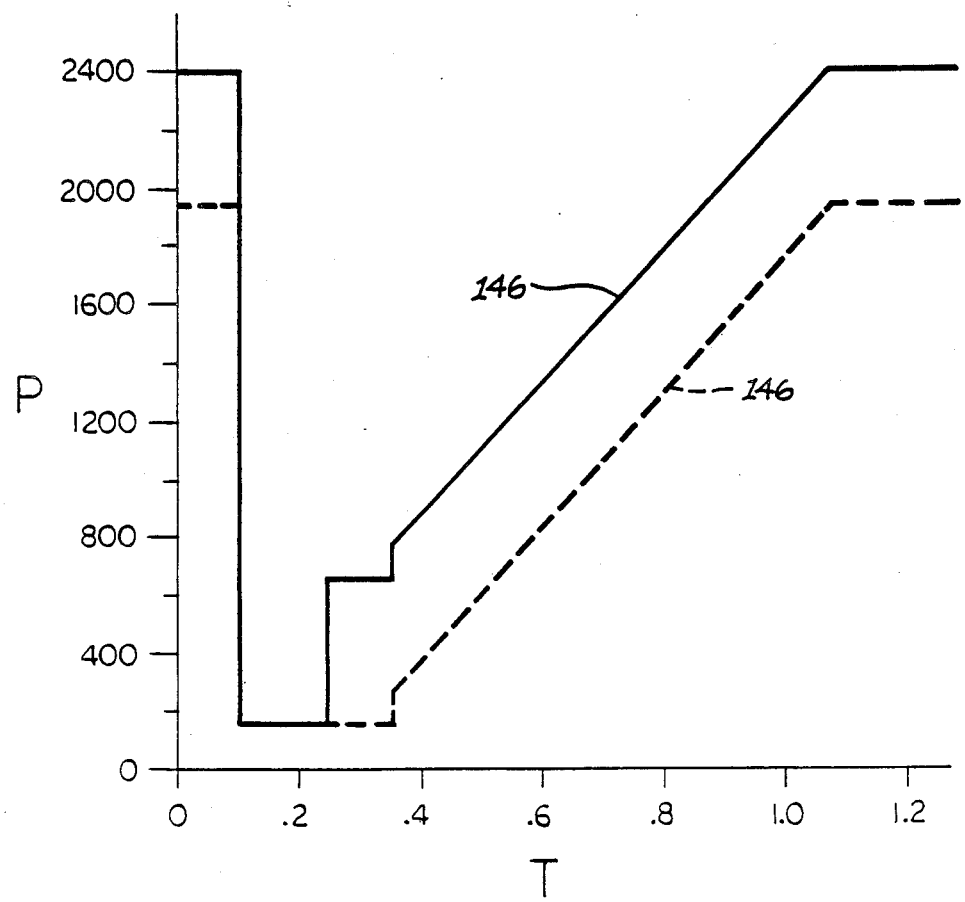

RATIO VALVE TO CONTROL UNLOADING OF MODULATING RELIEF VALVE

DESCRIPTION

1. Technical Field

This invention relates generally to a fluid system having a modulating relief valve for controlling the rate of pressure rise to a fluid actuator and more particularly to a ratio valve used to control the unloading of the modulating relief valve to fully reset the load piston of the modulating relief valve prior to pressurizing the fluid actuator.

2. Background Art

In fluid systems, such as transmissions having fluid actuated clutches, there has been a problem trying to ensure that the load piston of the modulating relief valve is fully reset prior to initiating engagement of the respective clutches. This problem is normally associated with the fact that the system pressure does not have ample time to decrease before the respective clutch is filled and clutch engagement is again initiated. When the load piston does not fully reset, the higher pressure in the system creates harsh clutch engagement which is detrimental to the life of the clutch and other associated elements in the transmission.

It is advantageous to provide a system that ensures full reset of the load piston. Furthermore, in order to control overall costs, the system should be simple in construction.

Various arrangements have been used in the past in an effort to minimize the above-noted problems. One such arrangement is disclosed in U.S. Pat. No. 3,566,716 which issued on March 2, 1971 to P. K. Chatterjea. This patent teaches a control system for a transmission having directional and speed clutches. In this arrangement the directional clutches are filled and pressurized quickly while the speed clutches are subsequently filled and pressurized more slowly. The load piston in this arrangement is isolated from the system supply during filling of the directional clutches and opened to the system supply pressure during filling of the speed clutches. During the disengagement of one clutch and the subsequent engagement of another clutch, the load piston moves towards its unloaded condition. In this arrangement, this movement is controlled by the size of an orifice located in the load piston between the load piston pressure chamber and a system reservoir. If the orifice is too large, the rate of pressure rise is very slow and if the orifice is smaller to better control the rate of pressure rise, the load piston will not quickly reset. This system requires a compromise between the rate of pressure rise and the speed at which the load piston can be reset.

U.S. Pat. No. 3,799,308 which issued on March 26, 1974 to E. R. Erisman teaches a control system for a transmission having directional and speed clutches. This system includes a modulating pressure reducing valve that has a load piston which controls the rate of pressure rise in the clutch actuator during engagement of the respective clutch. In this arrangement, the load piston resets only in response to the clutch actuator pressure reducing to a low pressure, such as 30 psi. Since the load piston is in direct communication with the pressure of the clutch actuator pressure, it is necessary for both pressure levels to be reduced to the low pressure level quickly. The pressure level in the clutch actuator normally has a tendency to reduce at a slower rate since this reduction is directly proportional to the speed that the clutches fill. This inhibits the ability of the load piston to reach the fully reset position prior to the clutch being filled and engagement initiated. Consequently, harsh clutch engagement results.

U.S. Pat. No. 4,046,160 which issued on Sept. 6, 1977 to Joachim Horsch teaches a control system for a transmission having directional and speed clutches. This system also includes a load piston which acts to control the rate of pressure rise during engagement of the respective clutches. This arrangement also includes a separate piston which responds to both the pressure in the directional clutches and to the pressure in the speed clutches to control opening of a quick vent passage that allows the load piston to quickly reset during directional and speed changes in the transmission. The separate piston in this arrangement acts as a differential valve to establish a higher fill pressure in the directional clutch as compared to the fill pressure in the speed clutch. In order for the load piston to quickly reset, the pressure in the system must be reduced to the pressure level of the directional clutch fill pressure. Consequently, the clutch could possibly be filled prior to the system pressure reducing to the required level which results in the load piston not being fully reset prior to initial clutch engagement. This normally results in harsh or jerky clutch engagement.

U.S. Pat. No. 4,132,302 which issued to P. K. Chatterjea on Jan. 2, 1979 teaches a control for a transmission having directional and speed clutches. This system includes a load piston which controls the rate of pressure rise in the respective clutch actuators. This arrangement also has another piston which automatically connects the load piston pressure chamber with the drain for quick load piston resetting in response to the pressure in the clutch actuators. In this arrangement, the pressure in the clutch actuators must be reduced to the level equivalent to clutch fill pressure in order for the other piston to quickly respond and reset the load piston. Consequently, if the clutch is filled before the system pressure reaches the required reduced pressure, the load piston will not fully reset. This, as above, results in harsh clutch engagement.

The present invention is directed to overcoming one or more of the problems as set forth above.

DISCLOSURE OF THE INVENTION

In one aspect of the present invention a fluid system is provided having a source of pressurized fluid, a reservoir, a force transmitting mechanism adapted to receive fluid from said source, and a selector valve connected between the source and the force transmitting mechanism and movable to selectively direct fluid from the source to fill and pressurize the force transmitting mechanism and to vent the force transmitting mechanism to the reservoir. A modulating pressure relief valve has a valve element and a load piston movable between a substantially unloaded position and a load position is connected to the source and to the force transmitting mechanism. The modulating relief valve is adapted to control the rate of pressure rise of the fluid directed to the force transmitting mechanism. A means is provided for establishing a ratio between the pressure of the fluid being directed to the force transmitting mechanism and the pressure of the fluid acting on the load piston of the modulating pressure relief valve so that the pressurized fluid acting on the load piston during the filling of the force transmitting mechanism can be vented to the reservoir for resetting of the load piston to the substantially unloaded position even though the pressure of the fluid available to the force transmitting mechanism is still temporarily at a higher pressure.

In another aspect of the present invention, a valve assembly adapted for use in a fluid system is provided. The valve assembly includes a housing defining a single bore, an inlet port, a control port and a plurality of drain ports each intersecting the single bore in axially spaced relation. A load piston is slidably disposed in the single bore of the housing and a valving element is slidably disposed in the single bore adjacent the load piston and is movable between a first position at which the inlet port is blocked from one of the plurality of drain ports and a second position at which the inlet port is open to the one drain port. The valving element defines a blind bore in one end and an annular groove in the outer periphery thereof. A passage is defined in the valving element interconnecting the blind bore in the valving element with the annular groove thereof and another one of the plurality of drain ports. The valving element defines another passage interconnecting the blind bore in the valving element and the control port in the housing while a pressure chamber is defined in the single bore between the load piston and the valving element. A ratio valve mechanism is slidably disposed in the blind bore of the valving element and movable between a first position at which the first mentioned passage in the valving element is blocked from the pressure chamber and a second position at which the first passage is open to the pressure chamber. The ratio valve mechanism defines a predetermined effective cross-sectional area in communication with the pressure chamber and a smaller effective cross-sectional area in continuous open communication with the control port through the another passage in the valving element.

The present invention provides a fluid system adapted for use in a transmission that provides a control for a load piston to ensure that the load piston is fully reset when there is a directional or speed change made in the transmission. The establishing means provides a ratio between the pressure fluid being directed to the force transmitting mechanism or clutch and the pressure of the fluid acting on the load piston so that the pressure acting on the load piston can be vented to the reservoir for fully resetting of the load piston even though the pressure available to the force transmitting mechanism is still temporarily at a higher pressure level. This arrangement allows the load piston to be fully reset even when the system pressure has not been lowered to the pressure of the fluid acting on the load piston which in the prior art systems is the same as the system pressure. Once the pressure acting on the load piston has been vented, the main relief valve spool opens to vent the system pressure since there is no longer any fluid pressure in the load piston chamber.

BRIEF DESCRIPTION OF THE DRAWINGS

FIG. 3 is a graph illustrating the relationship between the operating pressures of the fluid devices in FIG. 1 versus time.

BEST MODE FOR CARRYING OUT THE INVENTION

Figure 1:
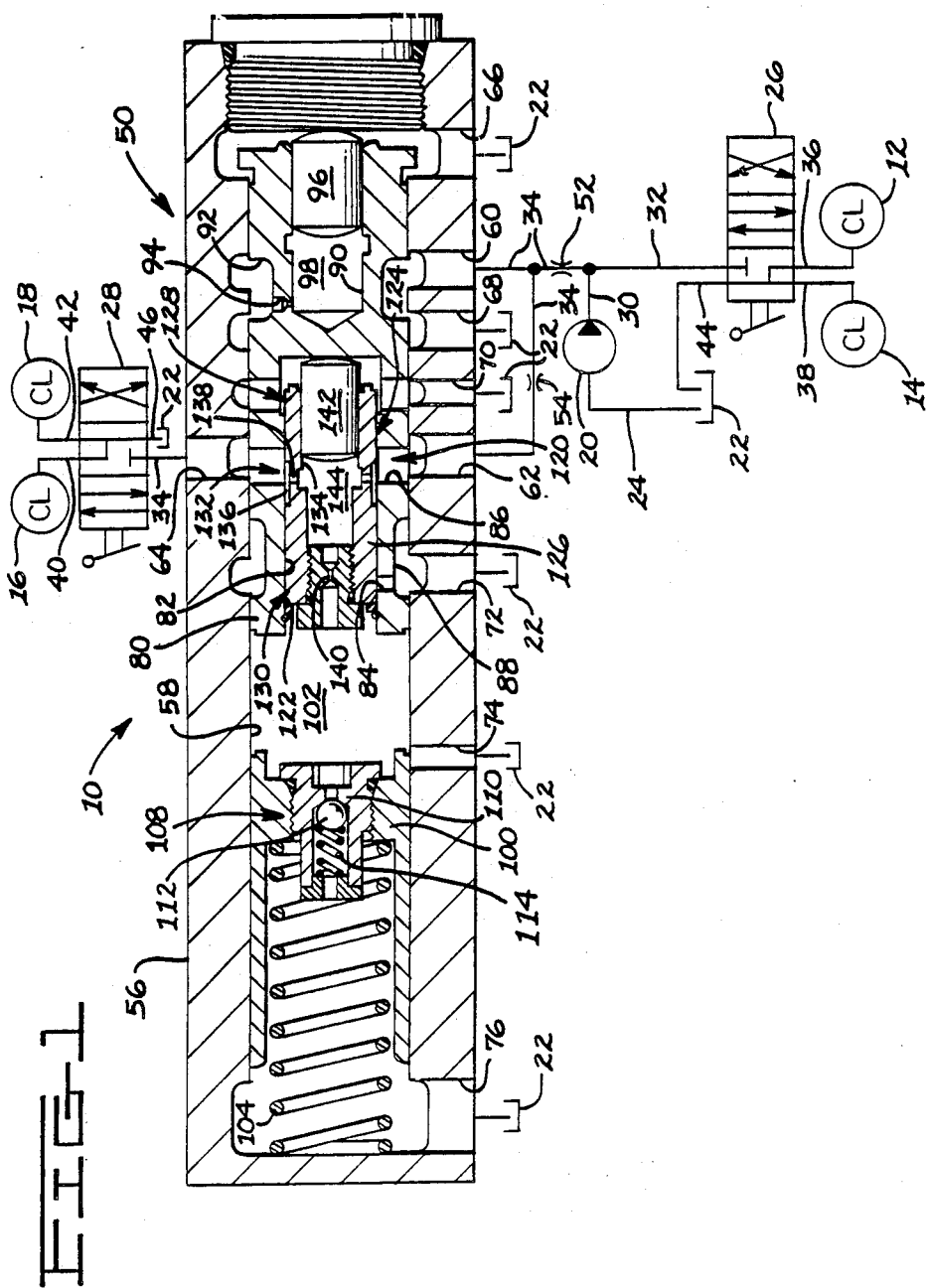
FIG. 1 is a partial schematic and diagrammatic representation of a fluid system incorporating an embodiment of the present invention.
Figure 2:
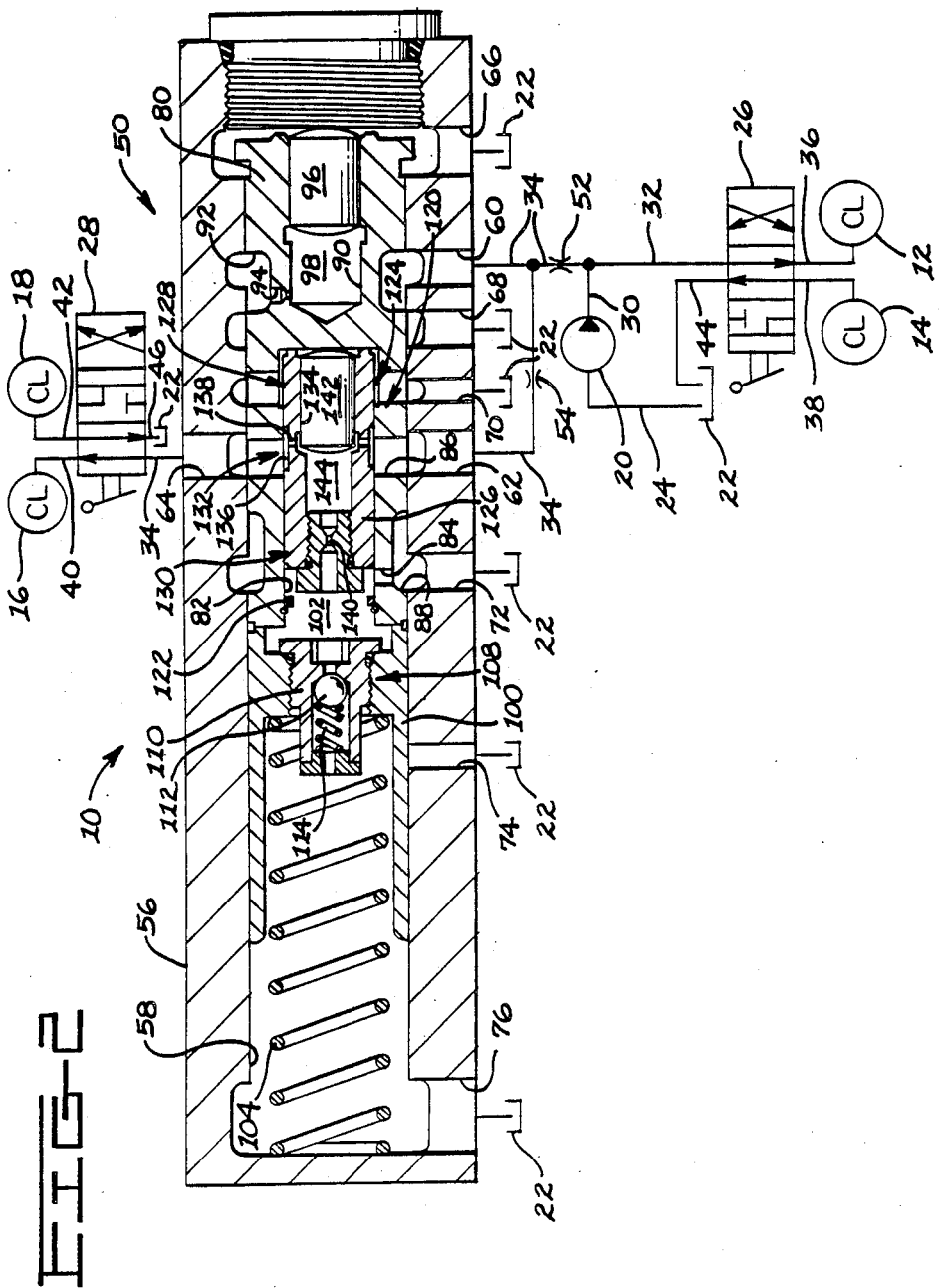
FIG. 2 is a partial schematic and diagrammatic representation of the fluid system of FIG. 1 in one mode of operation.

Referring now to the drawings, and more particularly to FIGS. 1 and 2, a fluid system 10 is shown for use in a vehicle (not shown) to selectively control the engagement and disengagement of a plurality of force transmitting mechanisms, such as speed clutches 12,14 and directional clutches 16,18 and to control the rate of pressure rise therein.

The fluid system includes a source of pressurized fluid, such as a pump 20, adapted to receive fluid from a reservoir 22 through a conduit 24. Speed and directional selector valves 26,28 are connected to the pump 20 by distribution conduits 30,32,34. Conduits 36,38 respectively connect speed clutches 12 and 14 to the speed selector valve 26 while conduits 40,42 respectively connect directional clutches 16,18 to the directional selector valve 28. Each of the selector valves 26,28 are respectively connected to the reservoir 22 by conduits 44,46.

A modulating relief valve 50 is connected to the pump 30 through the distribution conduit 34. An orifice 52 is located in the distribution conduit 34 upstream of the directional selector valve 28 and operative to establish a differential pressure between the fluid flow to the speed clutches 12,14 and the directional clutches 16,18. Another orifice 54 is located in the distribution conduit 34 downstream of the connection of the modulating pressure relief valve 50 to the distribution conduit 34 and is operative to control the rate of fluid flow to the directional clutches 16,18.

The modulating relief valve 50 includes a housing 56 having a single bore 58 defined therein, an inlet port 60, a control port 62, an outlet port 64 which is in continuous communication with the control port 62, and a plurality of drain ports 66,68,70,72,74,76. With the exception of the outlet port 64 which is in transverse alignment with control port 62, each of the above-noted ports intersect the single bore 58 at axially spaced locations.

A valving element, such as a spool 80, is slidably disposed in the single bore 58 of the housing 56. The valving element 80 has a blind bore 82 defined in one end thereof, and first and second passages 84,86 which interconnect the blind bore 82 and the single bore 58. The first and second passages are axially spaced from each other. An annular groove 88 is defined on an outer periphery of the spool 80 and the first passage 84 opens into the annular groove 88. Another blind bore 90 is defined in the other end of the valve spool 80. A second annular groove 92 is defined on the outer periphery of the spool 80 and another passage 94 is defined in the spool 80 and interconnects the blind bore 90 and the annular groove 92. The first annular groove 88 is in continuous communication with the drain port 72 while the second annular groove 92 is in continuous communication with the inlet port 60 and in selective communication with the drain port 68. A slug 96 is slidably disposed in the second blind bore 90 and defines a pressure chamber 98 between the bottom of the blind bore 90 and one end of the slug 96. A load piston 100 is slidably disposed in the single bore 58 adjacent the spool 80 and a pressure chamber 102 is defined in the single bore between the load piston 100 and the spool 80. A spring 104 is located in the single bore 58 and contacts the load piston on the side opposite the pressure chamber 102 and biases the load piston 100 towards a first position. The load piston moves towards a second position in response to an increase of pressure in the pressure chamber 102 and in opposition to the bias of the spring 104.

A relief valve 108 is disposed in the load piston 100 and is operative to limit the maximum pressure in the pressure chamber 102. The relief valve 108 includes a seat member 110, a ball 112 which is normally in contact with the seat member 110 and a spring 114 which bias the ball to a closed position.

A means 120 is provided for establishing a ratio between the pressure of the fluid being directed to the force transmitting mechanisms 12,14,16,18 and the pressure of the fluid acting on the load piston 100 of the modulating relief valve 50. The establishing means 120 is slidably disposed in the blind bore 82 and retained therein by a lock assembly 122. The establishing means 120 includes a ratio valve mechanism 124 movable between first and second positions. The ratio valve mechanism 120 has a predetermined effective cross-sectional area responsive to the pressure of the fluid acting on the load piston 100 and a smaller effective cross-sectional area responsive to the pressure of the fluid directed to the force transmitting mechanisms 16,18. The ratio valve mechanism 124 includes a valve member 126 which is slidably disposed in the blind bore 82 of the spool 80 and has a first end portion 128, a second end portion 130, and an intermediate portion 132. A bore 134 is defined in the valve member 126 and an annular groove 136 is defined in the outer periphery thereof and is in open communication with the bore 134 through a passage 138. A restrictive passage, such as an orifice 140 is defined in the second end portion 130 of the valve member 126 adjacent the pressure chamber 102. A slug 142 is slidably disposed in the bore 134 of the first end portion 128 and a pressure chamber 144 is defined in the bore 134 between the orifice 140 and the slug 142. The second end portion 130 adjacent the pressure chamber 102 has a predetermined cross-sectional area while the effective cross-sectional area of the first end portion 128 the valve of member 126 exposed to the pressure chamber 144 is smaller.

FIG. 3 illustrates a typical pressure curve depicting the various pressure levels in the speed and directional clutches versus time during a change in direction and/or speed when the clutches are being filled and subsequently increasing the pressure therein. The solid line 146 represents the pressure in the speed clutches from a point at which the fluid in the clutch is being dumped, filled, and followed by a subsequent controlled rate of rise in the pressure level to the maximum pressure level. The dashed line 148 likewise represents the pressure of the fluid in the directional clutches from the time that they are being dumped, filled, and subsequently controllably increased in pressure.

It is recognized that various forms of the fluid system 10 could be used without departing from the essence of the invention. For example, the ratio establishing means 94 could be in a separate housing. Furthermore, the distribution conduit 34 does not need to pass through the housing 56 of the modulating relief valve 50. The portion of the distribution conduit 34 downstream of the orifice 54 could be directly connected to the selector valve 28 and another conduit could connect the control port 62 to the distribution conduit 34 thus eliminating the outlet port 64. In the subject arrangement, the modulating relief valve with its integral ratio establishing means make up a modulating relief valve assembly.

INDUSTRIAL APPLICABILITY

During the neutral condition of the fluid system 10, as shown in FIG. 1, pressurized fluid from the pump 20 is directed the speed selector valve 26 through the distribution conduits 30,32 while simultaneously being directed to the directional selector valve 28 through the distribution conduit 34 across the orifices 52,54. The distribution conduit 34 also directs the pressurized fluid to the inlet port 60 of the modulating relief valve 50. With the fluid system 10 in the neutral condition, the modulating relief valve 50 maintains the system pressure at the inlet port 60 at its maximum pressure level. Any excess fluid flow is controllably bypassed to the drain port 68 by the movement of the spool 80. The spool 80 is movable between a first position at which the spool 80 blocks fluid communication between the inlet port 60 and the drain port 68 and a second position at which the inlet port 60 is in fluid communication with the drain port 68 across the annular groove 92. The pressurized fluid from the pump 20 is in continuous communication with the pressure chamber 98 through the annular groove 92 and the passage 94. The pressurized fluid in the chamber 98 acting against the slug 96 and the bottom of the blind bore 90 is operative to bias the spool 80 towards its second position thus controllably communicating fluid at the inlet port 60 with the drain port 68.

Simultaneously, the pressurized fluid from the pump 20 is directed through the distribution conduit 34 across the orifice 54 to the control port 62 and subsequently to the pressure chamber 102 through the passage 86, the annular groove 136, the passage 138, the pressure chamber 144, and the orifice 140. The fluid pressure in the pressure chamber 102 acting on the end of the spool 80 biases the spool 80 in opposition to the force of the pressurized fluid in the pressure chamber 98. Furthermore, the pressurized fluid in the chamber 102 acts against the end of the load piston 100 to move the load piston from its first position towards its second position as shown in FIG. 1 against the bias of the spring 104. Once the load piston 100 reaches the position as shown in FIG. 1, the pressurized fluid from the pressure chamber 102 is controllably bypassed to the reservoir 22 through the drain port 74 to maintain a predetermined maximum pressure level in the pressure chamber 102. In a typical system, the pressure level in the pressure chamber 98 is approximately four times greater than the pressure in the pressure chamber 102. Once this pressure balance is achieved, the spool 80 remains substantially in the position shown in FIG. 1 in which the pressurized fluid from the pump 20 is being controllably bypassed to the reservoir 22 through the drain port 68 while maintaining the system pressure at its maximum level.

The valve member 126 of the ratio valve mechanism 124 is movable between a first position, as shown in FIG. 1, at which the pressure chamber 102 is blocked from the drain port 72 and a second position at which the pressure chamber 102 is in open communication with the drain port 72 through the passage 84 and the annular groove 88. The valve member 126 of the ratio valve mechanism 124 is biased to the first position in response to the pressurized fluid in pressure chamber 144 acting against the slug 142 and is biased towards the second position in response to the fluid pressure in pressure chamber 102. The valve member 126 moves to the second position when the pressure of the fluid in pressure chamber 102 exceeds a preselected value with respect to the pressure in the pressure chamber 144. In the subject arrangement, the pressure level of the fluid in the pressure chamber 144 is approximately three times higher than the pressure level in the pressure chamber 102 to maintain the valving element 126 in its first position.

FIG. 2 illustrates the operation of the fluid system 10 upon placing the directional selector valve 28 and the speed selector valve 26 in one of the operational modes. Due to the filling of the directional clutch 16 and the speed clutch 12, in the operational mode shown, the pressure level of the fluid in the distribution conduits 30,32,34 drops to a very low level, as clearly shown by the representation in FIG. 3 of the lines illustrated at the lower portion of the drawing.

In order to eliminate harshness of engagement of the clutches, it is necessary to reduce the pressure level of the fluid in the clutches being disengaged and to quickly reduce the pressure of the fluid in the pressure chamber 102 acting on the load piston 100 so that the load piston can fully reset prior to the clutch being filled and engagement initiated. In the subject arrangement, as the pressure level in the pressure chamber 144 decreases as a result of the pressure in the clutches decreasing, the pressure level in the pressure chamber 102 reduces at a much slower rate since it is initially at a lower pressure level and the restrictive passage 140 restricts the ability of that pressure level to drop quickly. As the ratio between the pressure levels in the pressure chamber 144 and the pressure chamber 102 drops below the 3 to 1 ratio, the valve member 126 moves towards the right as shown in the drawing thus opening the communication of the pressure chamber 102 with the drain port 72. Consequently, the pressurized fluid in pressure chamber 102 is quickly dropped to a very low level thus allowing the load piston 100 to fully reset to the position as illustrated in FIG. 2. This happens even though the pressure level in the pressure chamber 144 is still at a higher pressure level. Simultaneously, the valving element 80 moves to the left, as viewed in FIG. 2, allowing communication between the inlet port 60 and the drain port 68 to quickly reduce the system pressure. The valving element 80 moves to the left since the force established in the pressure chamber 98 is now greater than the resisting force in pressure chamber 102. Consequently, the load piston 100 is totally reset at or prior to the time at which the respective clutches 12,16 are filled and engagement is initiated.

After the clutches have filled, the pressure level in the respective direction and speed clutches is increased as illustrated by the solid and dashed lines in FIG. 3. The fluid pressure in the speed clutch 12 increases from the low fill pressure to the low pressure setting of the relief valve quickly while the pressure level in the directional clutch 16 remains at the lower fill pressure. This is primarily attributed to the differential pressure created by the resistance to fluid flow across the orifice 52. The difference in pressure between the speed clutch and the directional clutch is directly proportional to the size of the orifice 52. The flat portion of the solid line 146 which follows the quick increase in pressure is representative of the time needed to complete the filling of the directional clutch 16. The corresponding flat portion of the dashed line 148 which parallels the above-noted solid line represents the final filling of the directional clutch before any additional increase in pressure occurs. The sudden transition of the solid and dashed lines from flat to vertical indicates that the directional clutch is filled. The pressure level then quickly increases to a point at which the spool 80 is in its fluid bypassing condition and the pressure level in chamber 102 is at the level to initiate movement of the load piston 100 against the bias of the spring 104. At this point the rate of pressure rise is controlled by the movement of the load piston 100 against the bias of the spring 104 as illustrated by the slope of the lines in FIG. 3. While the difference in pressure between the two lines of FIG. 3 is controlled by the size of the orifice 52, the angle of the slope is controlled by the relationship of the force of the spring 104 and the effective areas of the end of the relief valve spool 80 adjacent to pressure chamber 102 and the effective area of the slug 96 adjacent the pressure chamber 98.

Once the load piston 100 reaches the position as illustrated in FIG. 1, the maximum pressure levels have been reached in the respective clutches and are subsequently maintained therein as depicted by the horizontal slope of the line shown in FIG. 3. This pressure level is maintained in the respective speed and directional clutches and excess fluid not needed to provide for leakage is bypassed to the reservoir through the inlet port 60 and across the annular groove 92 to the drain port 68.

The fluid system as set forth above which incorporates the ratio establishing means provides an arrangement that ensures the load piston being fully reset during filling of the clutches even though the pressure level in the fluid system reduces at a slower rate. This arrangement eliminates the possibility of the clutches being initially engaged at a higher pressure level which creates harsh shocks to the system components. Furthermore, this relationship provides a compact arrangement that is simple in construction and utilizes easy manufacturing techniques.

Other aspects, objects and advantages of this invention can be obtained from a study of the drawings, the disclosure and the appended claims.

I claim:

1. A fluid system having a source of pressurized fluid, a reservoir, a force transmitting mechanism adapted to receive fluid from said source, a selector valve connected between the source and the force transmitting mechanism and movable to selectively direct fluid from the source to fill and pressurize the force transmitting mechanism and to vent the force transmitting mechanism to the reservoir, comprising:

a modulating pressure relief valve having a valve element and a load piston movable between a substantially unloaded position and a loaded position and operatively connected to the source and the force transmitting mechanism, said modulating relief valve being adapted to control the rate of pressure rise of the fluid directed to the force transmitting mechanism; and a ratio valve mechanism having a predetermined effective cross-sectional area responsive to the pressure of the fluid acting on the load piston and a smaller effective cross-sectional area responsive to the pressure of the fluid directed to the force transfer mechanism, said ratio valve mechanism being operative to vent to the reservoir the pressurized fluid acting on the load piston during the filling of the force transmitting mechanism to reset the load piston to the substantially unloaded position even though the pressure of the fluid available to the force transmitting mechanism is at a higher pressure.

2. The fluid system, as set forth in claim 1, wherein the valve mechanism includes a valve member and a slug, said valve member has first and second end portions, a bore defined in the first end portion thereof and said slug is slidably disposed in the bore, said predetermined effective cross-sectional area is established by the second end portion of the valve member while the smaller effective cross-sectional area is defined by the end of the slug disposed in the bore of the valve member.

3. The fluid system, as set forth in claim 2, wherein the valve member has a restrictive passage defined therein between the slug and the second end portion, an outer peripheral surface, an annular groove defined in the outer surface, and a passage defined therein interconnecting the bore adjacent the restrictive passage and the annular groove.

4. The fluid system, as set forth in claim 3, wherein the modulating pressure relief valve includes a housing having a single bore defined therein, said valving element and said load piston being slidably disposed in the single bore of the housing, and said ratio valve mechanism being slidably disposed in the one end of the valving element adjacent the load piston.

5. The fluid system, as set forth in claim 4, wherein a blind bore is defined in one end of the valving element adjacent the load piston and said ratio valve mechanism is slidably located therein with the slug thereof contacting the bottom of the blind bore.

6. The fluid system, as set forth in claim 5, wherein the modulating pressure relief valve further includes a spring disposed in the single bore and operative to bias the load piston towards the valving element, and a pressure chamber is defined in the single bore between the load piston and the valving element.

7. The fluid system, as set forth in claim 6, wherein the valve element has a second blind bore defined in the other end thereof and a slug slidably disposed therein, a pressure chamber is defined in the valving element between the bottom of the second blind bore and the slug disposed therein, said pressure chamber in the valving element being in continuous operative communication with the source of pressurized fluid and adapted to bias the valving element in opposition to the force of said spring.

8. The fluid system, as set forth in claim 7, including another force transmitting mechanism adapted to receive fluid from the source and being connected to the selector valve, the selector valve being movable to selectively vent fluid from the one force transmitting mechanism and direct fluid from the source to fill and pressurize the another force transmitting mechanism.

9. The fluid system, as set forth in claim 8, including an orifice located between the source and the modulating pressure relief valve, yet another force transmitting mechanism connected to the source upstream of the orifice, and another selector valve connected between the source and the yet another force transmitting mechanism and being movable to selectively direct fluid from the source to fill and pressurize the yet another force transmitting mechanism and to vent the yet another force transmitting mechanism to the reservoir, said orifice being adapted to establish a difference in pressure between the first mentioned force transmitting mechanisms and the yet another force transmitting mechanism.

10. A valve assembly adapted for use in a fluid system, comprising:
a housing defining a single bore, an inlet port, a control port and a plurality of drain ports each intersecting the single bore in axially spaced relation;
a load piston slidably disposed in the single bore;
a valving element slidably disposed in the single bore adjacent the load piston and movable between a first position at which the inlet port is blocked from one of the plurality of drain ports and a second position at which the inlet port is open to the one drain port, said valving element defining a blind bore in one end and an annular groove in the outer periphery thereof, a passage is defined in the valving element interconnecting the blind bore in the valving element with the annular groove thereof and another one of the plurality of drain ports, and another passage is defined in the valve element interconnecting the blind bore in the valving element and the control port in the housing;
a pressure chamber defined in the single bore between the load piston and the valving element;
a ratio valve mechanism slidably disposed in the blind bore of the valving element and movable between a first position at which the first mentioned passage in the valving element is blocked from the pressure chamber and a second position at which the first passage is open to the pressure chamber, said ratio valve mechanism defining a predetermined effective cross-sectional area in communication with the pressure chamber and a smaller effective cross-sectional area in continuous open communication with the control port through the another passage in the valving element.

11. The valve assembly, as set forth in claim 10, wherein the ratio valve mechanism includes a valve member and a slug, said valve member has first and second end portions, a bore defined in the first end portion thereof and said slug is slidably disposed in the bore, and a restrictive passage is defined in the valve member interconnecting the bore in the valve member with the second end portion, said predetermined effective cross-sectional area is defined by the second end portion of the valve member while the smaller effective cross-sectional area is defined by the end of the slug disposed in the bore of the valve member.

12. The valve assembly, as set forth in claim 11, wherein the valve member also has an annular groove defined in the outer periphery thereof, and a passage defined in the valve member interconnecting the bore of the valve member adjacent the restrictive passage with the annular groove.

13. The valve assembly, as set forth in claim 12, including a spring disposed in the single bore and operative to bias the load piston towards the valving element.

14. The valve, as set forth in claim 13, wherein the load piston is spring biased to a first position at which the pressure chamber in the single bore is blocked from the yet another one of the plurality of drain ports and movable to a second position at which the pressure chamber in the single bore is open to the yet another one drain port.

15. The valve assembly, as set forth in claim 14, wherein the ratio valve mechanism is slidably retained in the blind bore of the valving element.

16. The valve assembly, as set forth in claim 15, wherein the valving element has a second blind bore defined in the other end thereof and a slug slidably disposed therein, and a pressure chamber defined in the valving element between the bottom of the second blind bore and the slug disposed therein, said pressure chamber being operative to receive pressurized fluid from the source and bias the valving element in opposition to said spring.

* * * * *